(12) United States Patent
Henrich et al.

(10) Patent No.: US 9,556,988 B2
(45) Date of Patent: Jan. 31, 2017

(54) CLAMPING DEVICE

(71) Applicant: NORMA GERMANY GMBH, Maintal (DE)

(72) Inventors: Detlef Henrich, Limesheim (DE); Mathias Krauss, Nidderau (DE)

(73) Assignee: NORMA GERMANY GMBH, Maintal (DE)

( * ) Notice: Subject to any disclaimer, the term of this patent is extended or adjusted under 35 U.S.C. 154(b) by 136 days.

(21) Appl. No.: 14/158,082

(22) Filed: Jan. 17, 2014

(65) Prior Publication Data
US 2014/0201956 A1  Jul. 24, 2014

(30) Foreign Application Priority Data

Jan. 23, 2013 (DE) ........................ 10 2013 001 125

(51) Int. Cl.
*F16L 33/08* (2006.01)

(52) U.S. Cl.
CPC ............ *F16L 33/085* (2013.01); *F16L 33/08* (2013.01); *Y10T 24/1431* (2015.01); *Y10T 29/49826* (2015.01)

(58) Field of Classification Search
CPC ..... F16L 33/085; F16L 33/08; Y10T 24/1431; Y10T 24/49826; Y10T 24/1427; Y10T 24/1429
See application file for complete search history.

(56) References Cited

U.S. PATENT DOCUMENTS

| 3,189,968 | A | * | 6/1965 | Henning | ................. F16L 33/08 24/274 P |
|---|---|---|---|---|---|
| 3,561,078 | A | | 2/1971 | Care | |
| 3,757,394 | A | | 9/1973 | Turner | |
| 4,047,268 | A | | 9/1977 | Buttriss | |
| 5,063,642 | A | | 11/1991 | Toth | |

(Continued)

FOREIGN PATENT DOCUMENTS

| DE | 70 12 732 | 8/1970 |
|---|---|---|
| DE | 66 09 684 | 8/1972 |

(Continued)

OTHER PUBLICATIONS

Korean Office Action conducted in counterpart Korea Appln. No. 10-2014-007757 (Dec. 31, 2014) (w/English translation).

(Continued)

*Primary Examiner* — Jack W Lavinder
(74) *Attorney, Agent, or Firm* — Greenblum & Bernstein, P.L.C.

(57) ABSTRACT

Clamping device and method of connecting clamping device that includes a clamping band having a first end and a second end and an engagement geometry on at least one surface; and a tensioning head having a housing attached to the clamping band in the region of the first end and through which the second end of the clamping band is guidable, and an engagement element in the housing that is engageable with the engagement geometry. The engagement element is connected to the housing by a flexible connection, so that the engagement element is swivelable between a pull-through position, in which the clamping band may be pulled through the housing, and an engagement position, in which the clamping screw may engage with the engagement geometry.

16 Claims, 3 Drawing Sheets

(56) References Cited

U.S. PATENT DOCUMENTS 5,315,737 A  5/1994  Ouimet
5,909,852 A  6/1999  Allert

FOREIGN PATENT DOCUMENTS

DE    31 30 112      2/1983
DE    196 53 005     6/1998
JP    60-21245       5/1985

OTHER PUBLICATIONS

European Office Action conducted in counterpart European Appln. No. 13196794.5 (May 14, 2014).
German Office Action conducted in counterpart German Appln. No. 10 2013 001 125.6 (Nov. 6, 2013).
Japanese Office Action conducted in counterpart Japan Appln. No. 2014-007701 (Nov. 25, 2014) (w/ English translation).
English Translation of Korean Office Action conducted in counterpart Korea Appln. No. 10-2014-007757 (Jul. 31, 2015).
China Office Action conducted in counterpart China Appln. No. 201410030333.9 (Feb. 23, 2016) (w/ English language translation).

\* cited by examiner

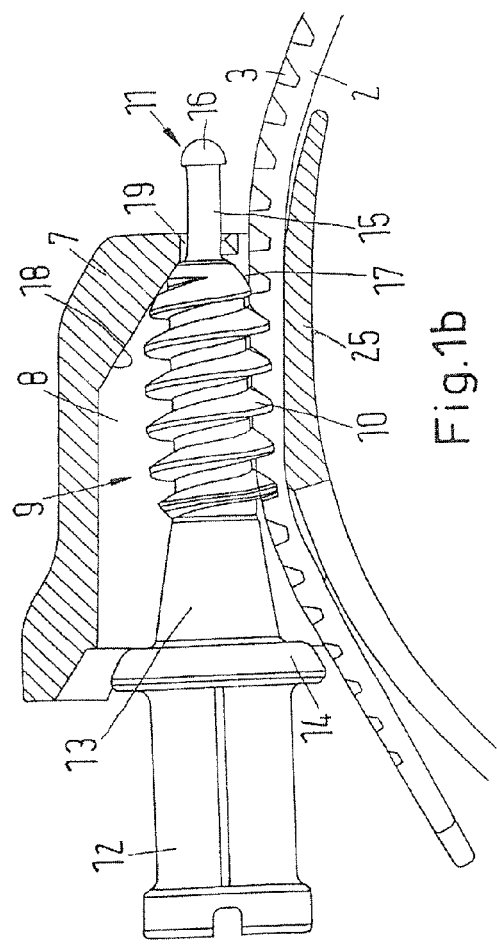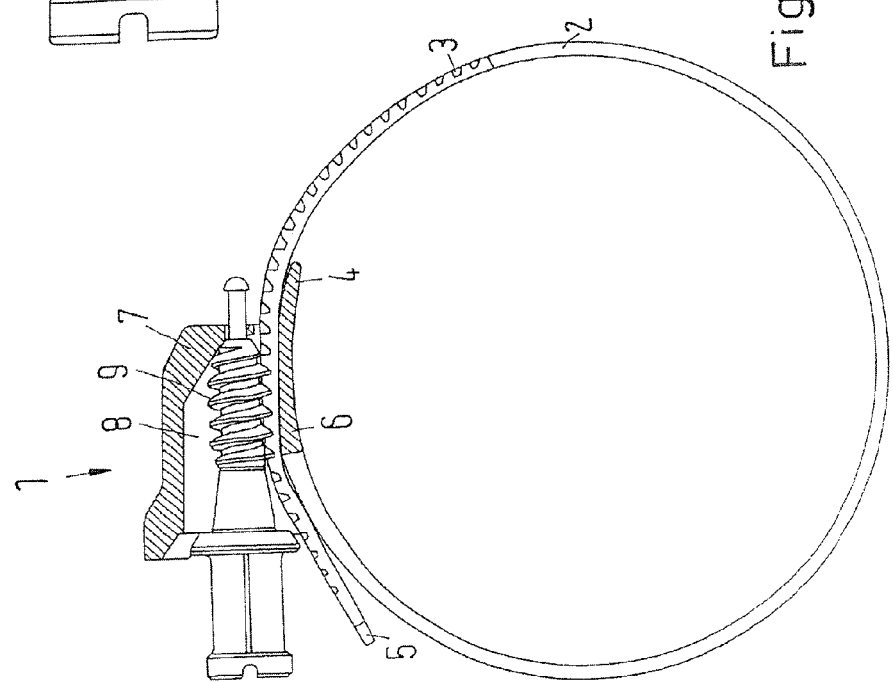

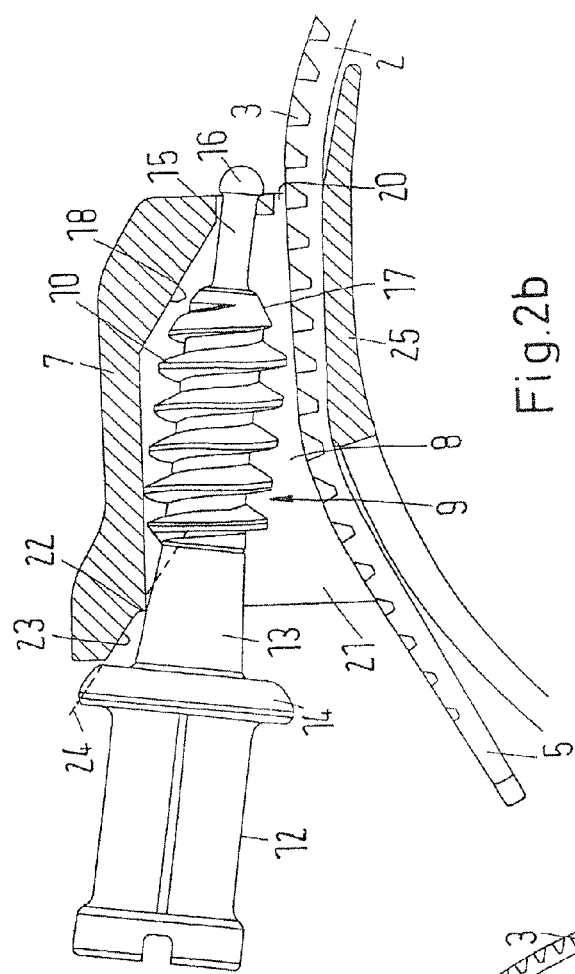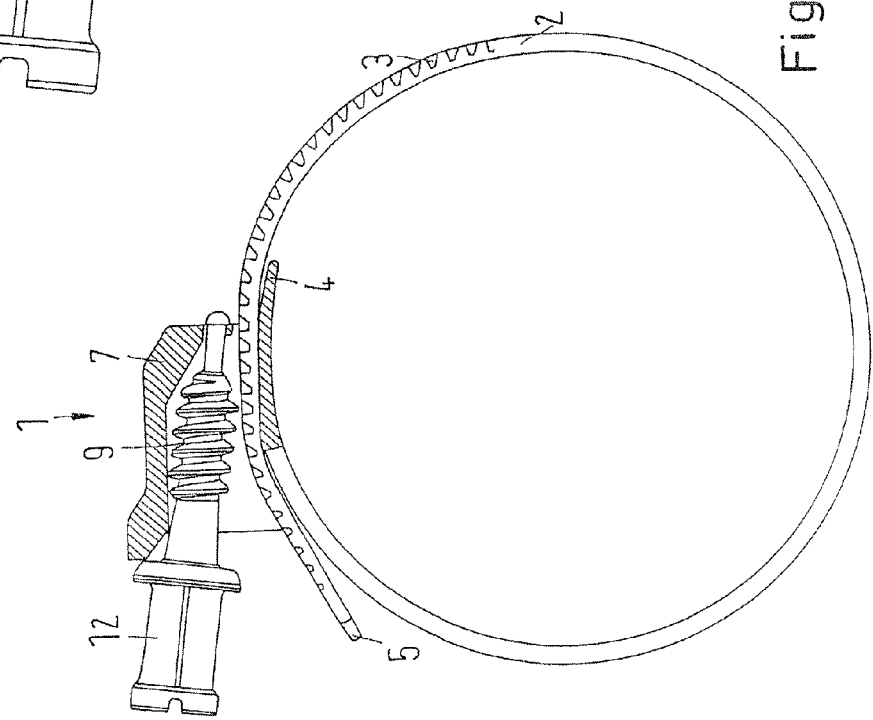
Fig.2b
Fig.2a

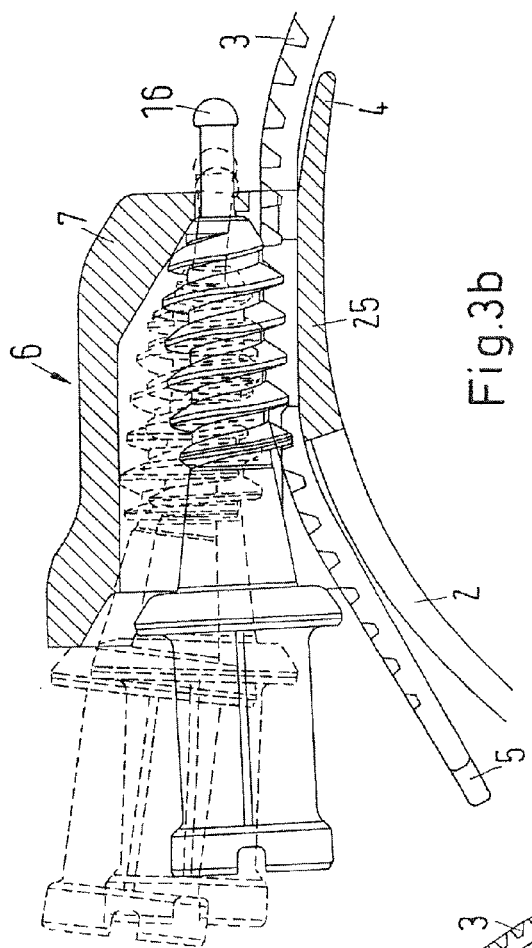
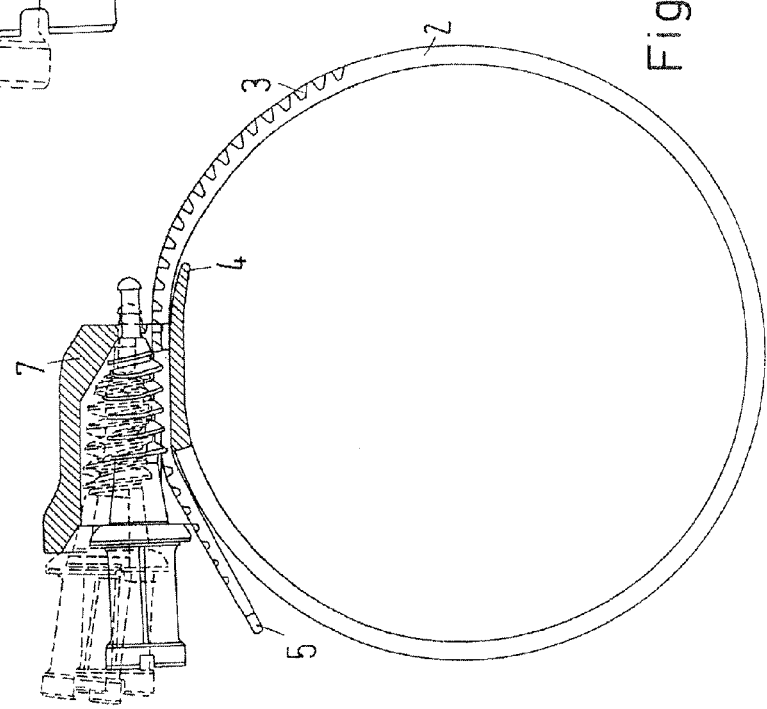

CLAMPING DEVICE

CROSS-REFERENCE TO RELATED APPLICATIONS

The present application claims priority under 35 U.S.C. §119 of German Patent Application No. 10 2013 001 125.6, filed on Jan. 23, 2013, the disclosure of which is expressly incorporated by reference herein in its entirety.

BACKGROUND OF THE INVENTION

1. Field of the Invention

The invention relates to a clamping device with a clamping band having a first end and a second end and a tensioning head having a housing attached to the clamping band in the region of the first end and through which the second end of the clamping band can be guided. The clamping band has an engagement geometry on at least one surface that can be engaged with an engagement element in the housing.

2. Discussion of Background Information

A clamping device of this type is for example used as a cable tie in order to consolidate a bundle of cables or lines or to attach a bundle of this type or only a single cable to a holder. For this purpose, the clamping band is guided around the parts that are to be connected to one another. The second end of the clamping band is then inserted into the housing of the tensioning head and pulled through the housing so that the engagement element engages with the engagement geometry on the surface of the clamping band. In most cases, this engagement cannot be released again or can only be released again with considerable effort. In most cases, only a limited tension force can be applied radially inwards using the clamping band, which is easily sufficient for the consolidation of cables but may no longer suffice for other purposes of use. This also applies if a tool, for example pliers, is used to tighten the clamping band.

However, a clamping device of this type has the advantage that the space bordered by the clamping hand that is inserted into the housing can be quickly varied in a simple manner within relatively wide limits. This variation occurs simply by pulling the second end of the clamping band through the housing.

SUMMARY OF THE INVENTION

Embodiments of the invention are directed to achieving a high tension force for a clamping device with a predetermined variation capability of the diameter.

Accordingly, a clamping device of the type named at the outset includes an engagement element embodied as a clamping screw that is connected to the housing by a flexible connection. The clamping screw can be swiveled between a pull-through position, in which the clamping band can be pulled through the housing, and an engagement position, in which the clamping screw is engaged with the engagement geometry.

With a clamping device of this type, the advantages of a cable tie are combined with the advantages of a clamp, e.g., a hose clamp or a worm drive clamp. It is, without difficulty, possible to quickly vary the diameter of the space surrounded by the clamping band by simply pulling the second end of the clamping band through the housing until the desired inner diameter is achieved. During this pull-through motion, the clamping screw is located in the pull-through position. When the clamping band has been pulled through the housing to a limit, where the limit is formed by the object or the objects around which the clamping band has been guided, then the clamping screw can be used to apply a higher tension force by turning the clamping screw. For this purpose, the clamping screw is swiveled or pivoted into the engagement position. Because the clamping screw is connected to the housing via a flexible connection, a swivel motion of this type is possible without difficulty. Compared to a pure displacement motion, a swivel motion has the advantage that the production of the engagement between the clamping screw and the engagement geometry and the release of this engagement can occur in a controlled manner. This engagement begins in the proximity of the flexible connection when the clamping screw is swiveled into the engagement position. During the swiveling into the pull-through position, the clamping screw can in any case obtain a relatively large distance from the engagement geometry with a large part of its thread, which considerably simplifies the pulling of the clamping band through the housing.

Preferably, the flexible connection allows a motion of the clamping screw along the longitudinal axis thereof. The flexible connection thus enables an additional movement capability of the clamping screw so that it is even easier to disengage the clamping screw from the engagement geometry on the clamping band or, conversely, to produce the engagement.

It is particularly preferred that the clamping screw is held captively in the housing. It is thus not necessary to pay any particular attention to keeping the clamping screw in the housing when the clamping band is pulled out of the housing. The loss prevention can for example be formed by the flexible connection.

Preferably, the clamping screw has a threaded section, a tip at one end and a torsional contact geometry at the other end. The flexible connection is arranged in the region of the tip of the clamping screw. In this case, the clamping screw engages, first with the threaded part, with the engagement geometry on the clamping band adjacent to the tip of the clamping screw during the movement into the engagement position. There, even the smallest lever arm to the flexible connection is produced so that this engagement can already occur with a relatively high force.

Here, it is preferred that the clamping screw has a projection connecting to the threaded section, which projection is inserted into an opening in the housing and has at its end facing away from the threaded section an enlargement. This projection then forms a part of the flexible connection. This flexible connection allows both a swiveling of the clamping screw with respect to the housing and also a translational motion of the clamping screw with respect to the housing. The enlargement forms a part of the loss prevention.

Preferably, the projection is smooth between the threaded section and the enlargement. The clamping screw can thus be moved in the opening in the housing without higher frictional forces or forces from positive fit being produced.

Preferably, the opening in the housing is embodied as an elongated hole into which the tip of the clamping screw projects. This elongated hole allows a motion of the clamping screw transversal to the longitudinal axis thereof. The elongated hole thus further increases the movement capabilities of the clamping screw in the housing. The clamping screw can also be swiveled sufficiently far with respect to the housing if the projection has a certain length.

Here, it is particularly preferred that the elongated hole enables a motion of the clamping screw perpendicular to the clamping band. As a result of this flexibility, it is particularly easy to produce or to once again release the engagement between the clamping screw and the clamping band. Expediently, the housing then has a sloped surface on which the clamping screw can be guided in the direction of the engagement geometry of the clamping band if a certain pull is applied to the clamping screw by the clamping band. This sloped surface then moves the clamping screw radially inwards under the guidance of the elongated hole so that the engagement with the clamping band is further strengthened.

Preferably, the clamping screw, between the threaded section and the torsional contact geometry, has an intermediate section with an increasing diameter that comes to bear against an inner edge of the housing in the pull-through position, which inner edge is distanced from the clamping band. Because of the increase in the diameter, the clamping screw is moved closer to the clamping band by its end adjacent to the torsional contact geometry when the clamping screw is moved into the housing along its rotational axis. The engagement between the clamping screw and the clamping band is thus strengthened.

Here, it is preferred that the clamping screw has on the side of the intermediate section facing away from the threaded section a diameter increase with a conical outer surface. The conical outer surface interacts with a bevel on an entrance opening of the housing. When the clamping screw is pressed into the housing along the rotational axis thereof, then the diameter increase which slides along the outer surface causes the screw to be moved radially inwards in the direction of the clamping band by the diameter increase so that an engagement between the clamping screw and the engagement geometry on the clamping band can ultimately be produced over the full length of the threaded section.

Embodiments of the invention are directed to a clamping device that includes a clamping band having a first end and a second end and an engagement geometry on at least one surface; and a tensioning head having a housing attached to the clamping band in the region of the first end and through which the second end of the clamping band is guidable, and an engagement element in the housing that is engageable with the engagement geometry. The engagement element is connected to the housing by a flexible connection, so that the engagement element is swivelable between a pull-through position, in which the clamping band may be pulled through the housing, and an engagement position, in which the clamping screw may engage with the engagement geometry.

In embodiments, the engagement element can include a clamping screw.

According to other embodiments, the clamping screw can have a longitudinal axis and the flexible connection can allow motion of the clamping screw along the longitudinal axis.

In other embodiments, the clamping screw may be captively held in the housing.

In accordance with still other embodiments of the invention, the clamping screw can have a threaded section, a tip at a first end and a torsional contact geometry at a second end, and the flexible connection can be arranged in a region of the tip. The clamping screw may have a projection connected to the threaded section that is insertable into an opening in the housing and the projection may have an enlargement at an end opposite the threaded section. Moreover, between the threaded section and the enlargement, the projection may be smooth. Still further, the opening in the housing may include an elongated hole into which the tip projects. The elongated hole may enable motion of the clamping screw perpendicular to the clamping band.

According to further embodiments of the instant invention, the clamping screw can have an intermediate section located between the threaded section and the torsional contact geometry and the housing can have an inner edge located at a distance from the clamping band. The intermediate section may have an increasing diameter that comes to bear against an inner edge of the housing in the pull-through position. Further, the clamping screw, on a side of the intermediate section opposite the threaded section, can include a conical outer surface with an increasing diameter. The conical outer surface can be structured to interact with a bevel located on an entrance opening of the housing.

Further embodiments of the invention are directed to a method of connecting the above-described clamping device on an element. The method includes positioning the clamping device in a region of the element where the clamping device is to be connected; guiding the second end of the clamping band around the element; pivoting the engagement element into the pull-through position; guiding the second end through the housing; and pivoting the engagement element into the engagement position, whereby the engagement element engages the engagement geometry. Further, the engagement geometry can include a clamping screw having a threaded section, a tip at a first end and a torsional contact geometry at a second end, and the method may further include rotating the torsional contact geometry to effect a tightening of the clamping band around the element. The clamping screw can have a longitudinal axis and the longitudinal axis of the clamping screw may be pivotable in the housing in a region of the tip.

Embodiments of the invention are directed to a method of connecting the clamping device onto an element, the clamping device having a clamping band with an engagement geometry and a housing with an engagement element and the clamping band being fixed in a region of one end to the housing. The method includes positioning the clamping device in a region of the element where the clamping device is to be connected; guiding a free end of the clamping band around the element; pivoting the engagement element into a pull-through position in which a space is formed for the second end to pass through the housing without engaging the engagement element; guiding the second end through the space; and pivoting the engagement element into an engagement position, whereby the engagement element engages the engagement geometry.

According to embodiments, the engagement geometry can include a clamping screw having a threaded section, a tip at a first end and a torsional contact geometry at a second end, and the method can further include rotating the torsional contact geometry to effect a tightening of the clamping band around the element. Further, the clamping screw can have a longitudinal axis and the longitudinal axis of the clamping screw can be pivotable in the housing in a region of the tip. Moreover, the clamping screw may have a projection connected to the threaded section, the projection may have an enlargement at an end opposite the threaded section and the housing can have an opening into which the projection extends.

In accordance with still other embodiments, the housing can include an inner edge arranged to define a limit to the pull-through position.

In accordance with still yet other embodiments of the present invention, the engagement element may include a bearing element and the housing can include a bearing surface that can contact each other when the engagement element is pivoted from the pull-through position to the engagement position.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 1a and 1b show a clamping device with a clamping screw engaged with a clamping band;

FIGS. 2a and 2b show the clamping device with the clamping screw disengaged from the clamping band; and FIGS. 3a and 3b show a representation for the illustration of the transition between the engagement position and the pull-through position.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1a shows a clamping device 1 in a schematic side view, partially in section. Clamping device 1 has a clamping band 2 that on a part of its radially outer surface has an engagement geometry which in the present case is embodied as an impressed thread, e.g., in the manner known from a worm drive clamp.

Clamping band 2 has a first end 4 and a second end 5. In the region of first end 4, a tensioning head 6 is attached which has a housing 7 with an accommodation space 8 for a clamping screw 9.

Housing 7 and clamping screw 9 are illustrated with further details in connection with FIG. 1b.

Clamping screw 9 has a threaded section 10, a tip 11 at one end and a torsional contact geometry 12 at the other end. Between torsional contact geometry 12 and threaded section 10, an intermediate section 13 is provided that is conically embodied, i.e., has an increasing diameter from threaded section 10 to torsional contact geometry 12. Between intermediate section 13 and torsional contact geometry 12, a diameter increase 14 is provided which has a conical outer surface, the diameter of which increases towards torsional contact geometry 12.

A projection 15 connects to threaded section 10 toward tip 11, and projection 11 ends at an enlargement 16. Projection 15 is embodied smoothly between threaded section 10 and enlargement 16.

Threaded section 10 has a conical section 17 located at an end facing projection 15. Threaded section 10 can also end before conical section 17, so that conical section 17 can thus be free of threaded elements.

Accommodation space 8 of housing 7 has a sloped surface 18 that forms a part of an inner cone at an end adjacent to tip 11. The angle of conical section 17 and the angle of sloped surface 18 are at least approximately the same size. Preferably, they are even exactly the same size.

Housing 7 has a pass-through opening 19 through which projection 15 is guided. Pass-through opening 19 is embodied as an elongated hole, i.e., it has an extension perpendicular to the clamping band 2 that is larger than an extension parallel to the axial direction of the annularly closed clamping band 2. The extension parallel to the axial direction of the clamping band 2 is smaller than the diameter of enlargement 16 so that clamping screw 9 is captively held in housing 7.

Pass-through opening 19 and projection 15 together form a flexible connection. This flexible connection allows a motion of clamping screw 9 with respect to housing 7 with multiple degrees of freedom. In this regard, screw 9 can move along its axial direction with respect to the housing 7, and this motion is limited on the one side by conical section 17 and on the other side by enlargement 16 of projection 15. However, it is sufficient so that conical section 17 can come clear of sloped surface 18.

Furthermore, the flexible connection allows a motion of clamping screw 9 radially outwards with respect to clamping band 2. Ultimately, pass-through opening 19 embodied as an elongated hole allows clamping screw 9 to be swiveled with respect to housing 7, as this can be recognized in FIGS. 3a and 3b. In FIGS. 3a and 3b, the depiction of clamping screw 9 in solid lines arranged in the engagement position correspond to the depiction of clamping screw 9 in FIGS. 1a and 1b. FIGS. 3a and 3b also show clamping screw 9 in dashed lines in a pull-through position, which is also depicted in FIGS. 2a and 2b and in a position between the engagement position and the pull-through position.

The elements in FIGS. 2a and 2b and 3a and 3b identical to those in FIGS. 1a and 1b are labeled with the same reference numerals.

In the pull-through position depicted in FIGS. 2a and 2b, clamping screw 9 is no longer engaged with engagement geometry 3 on the clamping band 2 so that the clamping band 2 can be freely pulled through housing 7. Housing 7 has for this purpose a pull-through opening 20 into which second end 5 of clamping band 2 can be threaded.

Accommodation space 8 of housing 7 has an entrance opening 21. In the pull-through position, intermediate section 13 bears against an inner edge 22 limiting entrance opening 21. Together with intermediate section 13, inner edge 22 thus limits the swivel angle that clamping screw 9 can achieve with respect to housing 7. Outside entrance opening 21, housing 7 has a sloped inside or bevel 23. It is indicated by a dashed line 24 that the diameter increase 14 is arranged somewhat radially outside an extension of the sloped inside 23 of housing 7 when clamping screw 9 is located in the pull-through position.

The path of the clamping screw between the engagement position illustrated in FIG. 1 and the pull-through position illustrated in FIG. 2, and vice versa, can be understood with the aid of FIG. 3.

In the engagement position, conical section 17 bears against sloped surface 18 of housing 7. Projection 15 has been guided through pass-through opening 19 in full length, i.e., enlargement 16 projects as far as possible out of housing 7. Threaded section 10 engages with engagement geometry 3 of clamping band 2. Clamping band 2 is supported by a housing base 25 in the region where clamping screw 9 is engaged with clamping band 2. Housing base 25 is illustrated here as part of first end 4 of clamping band 2.

However, housing base 25 can also be embodied separately from clamping band 2 and be connected to clamping band 2.

By the turning of clamping screw 9, threaded section 10 can move clamping band 2 further through housing 7. With a right-handed thread, a clockwise turning of clamping screw 9 causes a movement of clamping band 2 into housing 7, which leads to an increase in the tension exerted radially inwards by clamping band 2. At the same time, clamping band 2 is also tightened in a circumferential direction. The pull that thereby occurs causes clamping screw 9 to be pressed more strongly against sloped surface 18, whereby the engagement between clamping screw 9 and clamping band 2 is strengthened.

A counter-clockwise turning of clamping screw 9 causes clamping band 2 to be moved out of housing 7. The pull on clamping band 2 in a circumferential direction thereby decreases, and it is easier to disengage clamping screw 9 from clamping band 2.

When the pull acting between clamping band 2 and clamping screw 9 is small enough, then clamping screw 9 can be slightly pulled in a direction out of housing 7, i.e., until enlargement 16 comes to bear against the housing outside, as this can be recognized in FIG. 2b. During this motion or after this motion, clamping screw 9 can be swiveled, such that projection 15 forms a swivel point with pass-through opening 19. This swivel motion can be continued until intermediate section 13 comes to bear against inner edge 22 of housing 7. In this angular position, the clamping screw 9 is far enough away from clamping band 2 so that threaded section 10 disengages from engagement geometry 3. Even if this engagement is not completely released, it is still possible to pull clamping band 2 out of housing 7.

Conversely, if one desires to tighten clamping device 1, then second end 5 of clamping band 2 is guided through pull-through opening 20 of housing 7. Here, it is initially of no importance in which position clamping screw 9 is located. Should clamping screw 9 be located in the engagement position illustrated in FIG. 1b, then clamping screw 9 is, once engagement geometry 3 engages with threaded section 10, displaced along its rotational axis until enlargement 16 bears against the housing outside and clamping screw 9 can be swiveled into the pull-through position.

When clamping band 2 has been guided far enough through housing 7, e.g., by a fitter pulling on second end 5, clamping screw 9 can be moved into the engagement position by a light pressure on screw 9 when the pressure is directed along the rotational axis of clamping screw 9. In this motion, diameter increase 14 slides along the sloped inside 23, which leads to clamping screw 9 being swiveled towards clamping band 2. In an additional motion, conical section 17 comes to bear against sloped surface 18, which leads to threaded section 10 engaging with engagement geometry 3 on clamping band 2. This engagement occurs with a relatively large force, since a lever arm between the swivel point of clamping screw 9, which is embodied in pass-through opening 19, and threaded section 10 is shorter than a lever arm between the swivel point and torsional contact geometry 12, which the fitter grips. Once the engagement between clamping screw 9 and clamping band 2 is produced, clamping device 1 can be simply tightened by turning clamping screw 9 about its rotational axis. The rotational axis thereby runs through projection 15.

Clamping band 2 can be formed from a metal. However, it can also be formed from a plastic. Similarly, housing 7 can also be formed from a metal or a plastic. The same applies to clamping screw 9. The choice of the materials depends on the intended purpose of use.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A clamping device comprising:
   a clamping band having a first end and a second end and an engagement geometry on at least one surface; and
   a tensioning head having a housing attached to the clamping band in a region of the first end and through which the second end of the clamping band is guidable, and an engagement element in the housing that is engageable with the engagement geometry;
   wherein the engagement element is connected to the housing by a flexible connection, so that the engagement element is swivelable between a pull-through position, in which the clamping band may be pulled through the housing, and an engagement position, in which the engagement element is engageable with the engagement geometry,
   wherein the housing has a sloped surface configured to guide the engagement element in the direction of the engagement geometry of the clamping band upon the engagement element being drawn into the housing,
   wherein the engagement element comprises a clamping screw having a threaded section, a tip at a first end and a torsional contact geometry at a second end,
   wherein the flexible connection is arranged in a region of the tip,
   wherein the clamping screw has an intermediate section located between the threaded section and the torsional contact geometry and the housing has an inner edge located at a distance from the clamping band, and
   wherein the intermediate section has an increasing diameter that comes to bear against an inner edge of the housing in the pull-through position.

2. The clamping device according to claim 1, wherein the clamping screw has a longitudinal axis and the flexible connection allows motion of the clamping screw along the longitudinal axis.

3. The clamping device according to claim 1, wherein the clamping screw is captively held in the housing.

4. The clamping device according to claim 1, wherein the clamping screw has a projection, arranged between the threaded section and an enlargement at the tip, that is insertable into an opening in the housing.

5. The clamping device according to claim 4, wherein, between the threaded section and the enlargement, the projection is smooth.

6. The clamping device according to claim 5, wherein the opening in the housing comprises an elongated hole into which the tip projects.

7. The clamping device according to claim 6, wherein the elongated hole enables motion of the clamping screw perpendicular to the clamping band.

8. The clamping device according to claim 1, wherein the clamping screw, on a side of the intermediate section opposite the threaded section, comprises a conical outer surface with an increasing diameter, and wherein the conical outer surface is structured to interact with a bevel located on an entrance opening of the housing.

9. A method of connecting the clamping device according to claim 1 on an element, comprising:
- positioning the clamping device in a region of the element where the clamping device is to be connected;
- guiding the second end of the clamping band around the element;
- pivoting the engagement element into the pull-through position;
- guiding the second end through the housing, wherein the housing has a sloped surface on which the engagement element can be guided in the direction of the engagement geometry of the clamping band into the housing; and
- pivoting the engagement element as it is guided by the sloped surface into the engagement position, whereby the engagement element engages the engagement geometry.

10. The method according to claim 9, wherein the engagement geometry comprises a clamping screw having a threaded section, a tip at a first end and a torsional contact geometry at a second end, and the method further comprises rotating the torsional contact geometry to effect a tightening of the clamping band around the element.

11. The method according to claim 10, wherein the clamping screw has a longitudinal axis and the longitudinal axis of the clamping screw is pivotable in the housing in a region of the tip.

12. A method of connecting the clamping device onto an element, the clamping device having a clamping band with an engagement geometry and a housing with an engagement element, the clamping band being fixed in a region of one end to the housing, and the housing having a sloped surface on which the engagement element is guidable in a direction of the engagement geometry into the housing, the method comprising:
- positioning the clamping device in a region of the element where the clamping device is to be connected;
- guiding a free end of the clamping band around the element;
- pivoting the engagement element into a pull-through position in which a space is formed for the free end to pass through the housing without engaging the engagement element;
- guiding the free end through the space;
- pivoting the engagement element, whereby the engagement element is drawn into the housing; and
- upon the engagement element being drawn into the housing, guiding the engagement element via the sloped surface in a direction of the engagement geometry of the clamping band,
- wherein the housing includes an inner edge arranged to define a limit to the pull-through position.

13. The method according to claim 12, wherein the engagement geometry comprises a clamping screw having a threaded section, a tip at a first end and a torsional contact geometry at a second end, and the method further comprises rotating the torsional contact geometry to effect a tightening of the clamping band around the element.

14. The method according to claim 13, wherein the clamping screw has a longitudinal axis and the longitudinal axis of the clamping screw is pivotable in the housing in a region of the tip.

15. A method of connecting the clamping device onto an element, the clamping device having a clamping band with an engagement geometry and a housing with an engagement element, the clamping band being fixed in a region of one end to the housing, and the housing having a sloped surface on which the engagement element is guidable in a direction of the engagement geometry into the housing, the method comprising:
- positioning the clamping device in a region of the element where the clamping device is to be connected;
- guiding a free end of the clamping band around the element;
- pivoting the engagement element into a pull-through position in which a space is formed for the free end to pass through the housing without engaging the engagement element;
- guiding the free end through the space;
- pivoting the engagement element, whereby the engagement element is drawn into the housing; and
- upon the engagement element being drawn into the housing, guiding the engagement element via the sloped surface in a direction of the engagement geometry of the clamping band,
- wherein the engagement geometry comprises a clamping screw having a threaded section, a tip at a first end and a torsional contact geometry at a second end, and the method further comprises rotating the torsional contact geometry to effect a tightening of the clamping band around the element, and
- wherein the clamping screw has a projection connected to the threaded section, the projection has an enlargement at the tip and the housing has an opening into which the projection extends.

16. The method according to claim 12, wherein the engagement element includes a bearing element and the housing includes a bearing surface that contact each other when the engagement element is pivoted from the pull-through position to the engagement position.

* * * * *